(12) United States Patent
Zhou et al.

(10) Patent No.: US 10,892,807 B2
(45) Date of Patent: Jan. 12, 2021

(54) CODEBOOK ADAPTATION

(71) Applicant: QUALCOMM Incorporated, San Diego, CA (US)

(72) Inventors: Yan Zhou, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/452,222

(22) Filed: Jun. 25, 2019

(65) Prior Publication Data
US 2020/0007203 A1    Jan. 2, 2020

Related U.S. Application Data

(60) Provisional application No. 62/690,689, filed on Jun. 27, 2018.

(51) Int. Cl.
*H04W 16/28* (2009.01)
*H04B 7/0456* (2017.01)
*H04B 7/06* (2006.01)

(52) U.S. Cl.
CPC ......... *H04B 7/0482* (2013.01); *H04B 7/0617* (2013.01); *H04W 16/28* (2013.01)

(58) Field of Classification Search
USPC ................................................ 375/260, 267
See application file for complete search history.

(56) References Cited

U.S. PATENT DOCUMENTS

| 8,761,297 B2 * | 6/2014 | Erell ..................... H04B 7/0417 375/260 |
| 9,100,068 B2 | 8/2015 | Lakkis |
| 10,356,789 B2 * | 7/2019 | Raghavan ............ H04B 7/0617 |
| 2008/0165869 A1 * | 7/2008 | Kent .................... H04B 7/0639 375/260 |

(Continued)

FOREIGN PATENT DOCUMENTS

| WO | 2009117431 A2 | 9/2009 |
| WO | 2016184214 A1 | 11/2016 |

OTHER PUBLICATIONS

International Search Report and Written Opinion—PCT/US2019/039215—ISA/EPO—dated Aug. 19, 2019.

(Continued)

*Primary Examiner* — Eva Y Puente

(74) *Attorney, Agent, or Firm* — Harrity & Harrity, LLP/Qualcomm

(57) ABSTRACT

Various aspects of the present disclosure generally relate to wireless communication. In some aspects, a transmitter device may determine an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. In some aspects, the transmitter device may transmit using at least one beam of the adapted set of candidate beams associated with the adapted angular range based at least in part on determining the adapted codebook. Numerous other aspects are provided.

30 Claims, 10 Drawing Sheets

(56) References Cited

U.S. PATENT DOCUMENTS

2017/0347391 A1* 11/2017 Tenny ................. H04B 7/0617
2018/0302129 A1* 10/2018 Athley ................. H04L 5/0073
2020/0007216 A1*  1/2020 Nasiri Khormuji . H04B 7/0632

OTHER PUBLICATIONS

Xiao Z., et al., "Hierarchical Codebook Design for Beamforming Training in Millimeter-Wave Communication", IEEE Transactions on Wireless Communications, vol. 15, No. 5, Jan. 18, 2016 (Jan. 18, 2016), pp. 3380 3392, XP055306569, US ISSN: 1536-1276, DOI: 10.11 09/TWC.2016.2520930, Section 1.

* cited by examiner

CODEBOOK ADAPTATION

CROSS-REFERENCE TO RELATED APPLICATIONS UNDER 35 U.S.C. § 119

This application claims priority to U.S. Provisional Patent Application No. 62/690,689, filed on Jun. 27, 2018, entitled "TECHNIQUES AND APPARATUSES FOR CODEBOOK ADAPTATION," which is hereby expressly incorporated by reference herein.

FIELD OF THE DISCLOSURE

Aspects of the present disclosure generally relate to wireless communication, and more particularly to techniques and apparatuses for codebook adaptation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like).

A wireless communication network may include a number of base stations (BSs) that can support communication for a number of user equipment (UEs). A user equipment (UE) may communicate with a base station (BS) via the downlink and uplink. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

In some communications systems, such as NR systems, a transmitter device, such as a BS, may transmit to a receiver device, such as a UE, using beamforming. The BS may determine an angular coverage for one or more candidate beams for communication with the UE based at least in part on a codebook. Beamforming may be used to increase coverage range, reduce interference, and/or the like.

SUMMARY

In some aspects, a method of wireless communication, performed by a transmitter device, may include determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The method may include transmitting using at least one beam of the adapted set of candidate beams associated with the adapted angular range based at least in part on determining the adapted codebook.

In some aspects, a transmitter device for wireless communication may include memory and one or more processors operatively coupled to the memory. The memory and the one or more processors may be configured to determine an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The memory and the one or more processors may be configured to transmit using at least one beam of the adapted set of candidate beams associated with the adapted angular range based at least in part on determining the adapted codebook.

In some aspects, a non-transitory computer-readable medium may store one or more instructions for wireless communication. The one or more instructions, when executed by one or more processors of a transmitter device, may cause the one or more processors to determine an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The one or more instructions, when executed by the one or more processors of the transmitter device, may cause the one or more processors to transmit using at least one beam of the adapted set of candidate beams associated with the adapted angular range based at least in part on determining the adapted codebook.

In some aspects, an apparatus for wireless communication may include means for determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The apparatus may include means for transmitting using at least one beam of the adapted set of candidate beams associated with the adapted angular range based at least in part on determining the adapted codebook.

In some aspects, a method of wireless communication, performed by a receiver device, may include determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The method may include receiving using at least one beam of the adapted set of candidate beams associated with the adapted angular range based at least in part on determining the adapted codebook.

In some aspects, a receiver device for wireless communication may include memory and one or more processors operatively coupled to the memory. The memory and the one or more processors may be configured to determine an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The memory and the one or more processors may be configured to receive using at least one beam of the adapted set of candidate beams associated with the adapted angular range based at least in part on determining the adapted codebook.

In some aspects, a non-transitory computer-readable medium may store one or more instructions for wireless communication. The one or more instructions, when executed by one or more processors of a receiver device, may cause the one or more processors to determine an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The one or more instructions, when executed by the one or more processors of the receiver device, may cause the one or more processors to receive using at least one beam of the adapted set of candidate beams associated with the adapted angular range based at least in part on determining the adapted codebook.

In some aspects, an apparatus for wireless communication may include means for determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook. The apparatus may include means for receiving using at least one beam of the adapted set of candidate beams associated with the adapted angular range based at least in part on determining the adapted codebook.

Aspects generally include a method, device, apparatus, computer program product, non-transitory computer-readable medium, user equipment, base station, transmitter device, receiver device, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
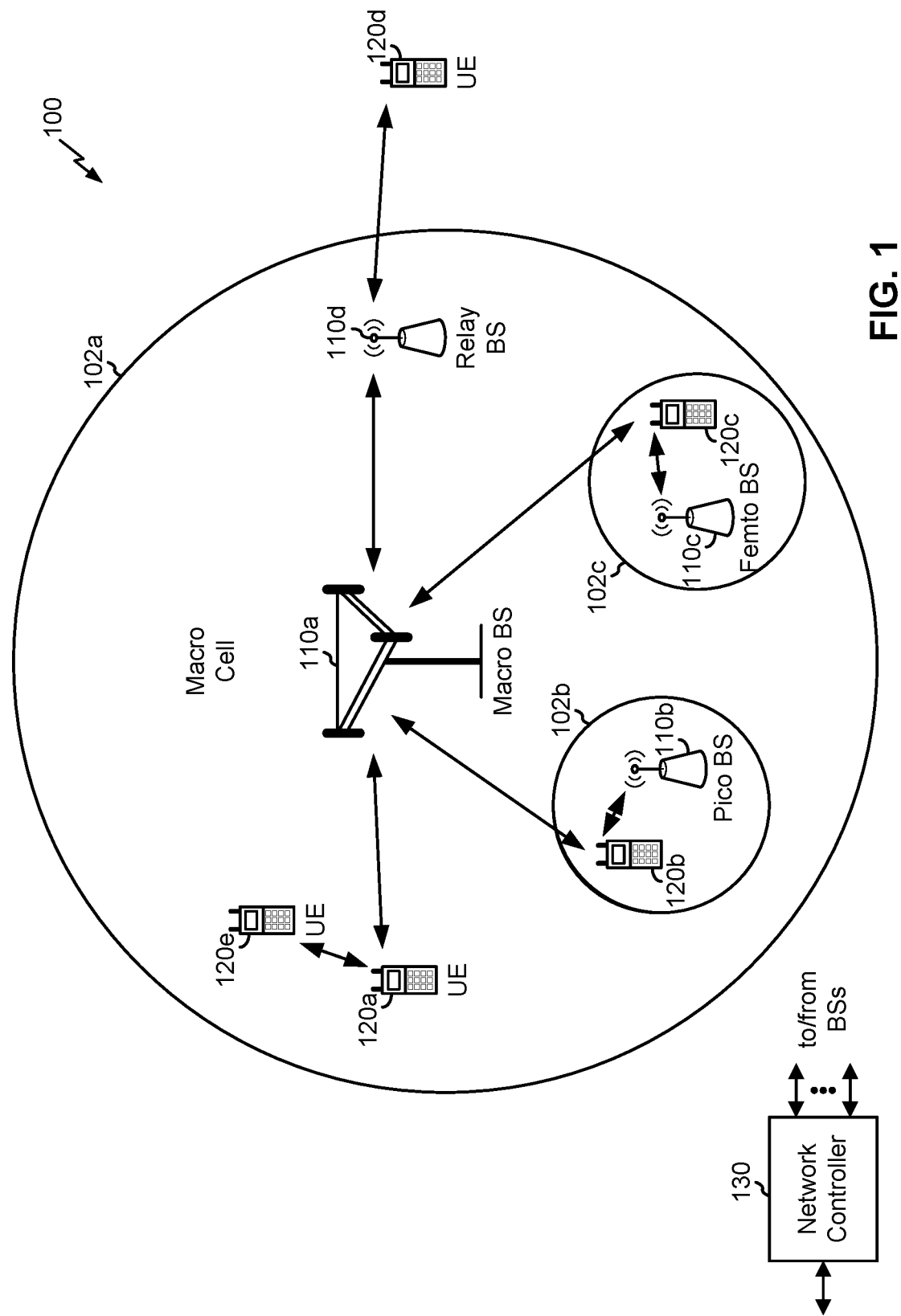
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
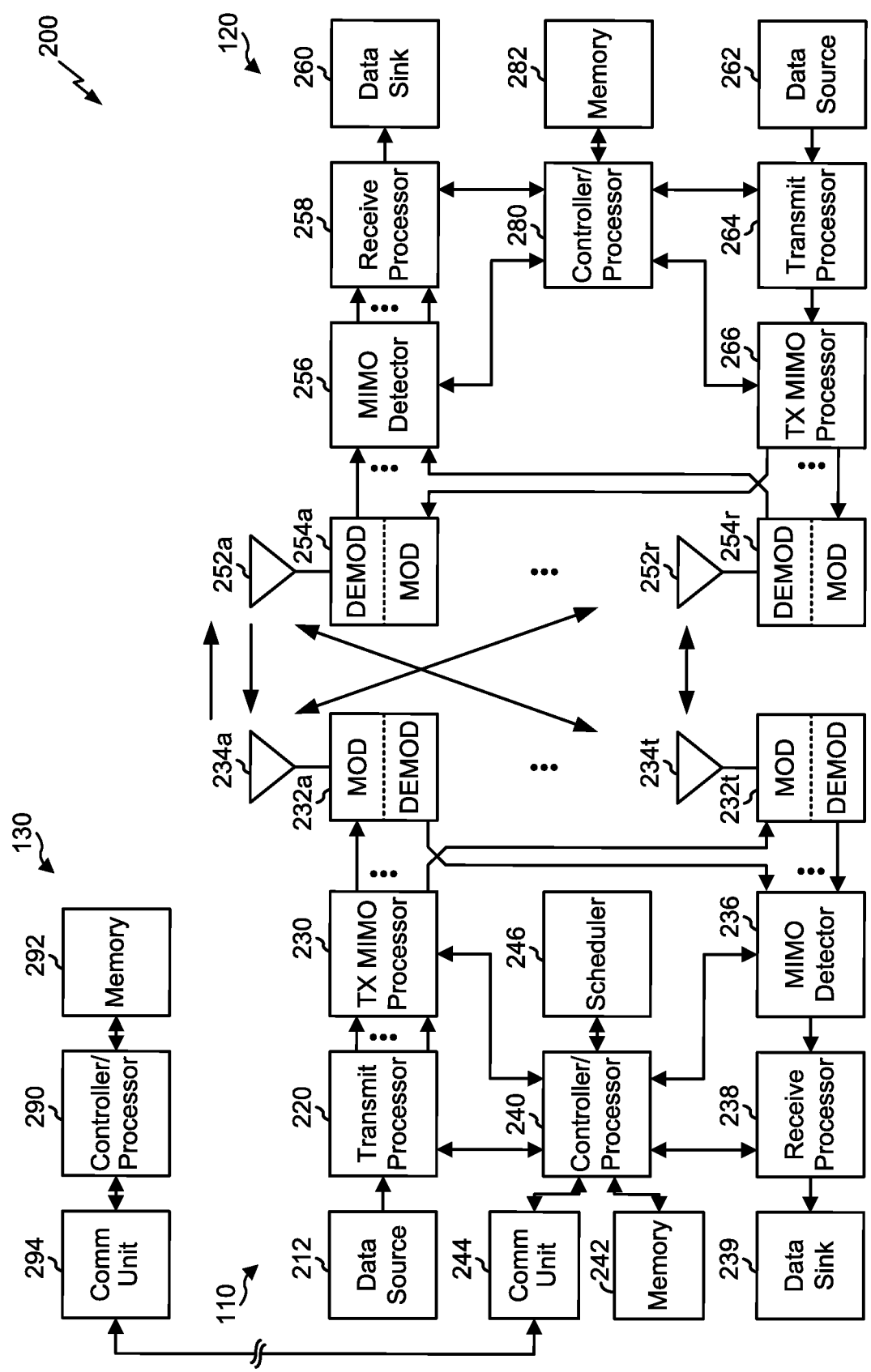
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with codebook adaptation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 800 of FIG. 8, process 900 of FIG. 9, and/or other processes as described herein. A scheduler 246 may schedule UEs for data transmission on the downlink and/or uplink.

In some aspects, a transmitter device (e.g., base station 110, UE 120, and/or the like) may include means for determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook; means for transmitting using at least one beam of the adapted set of candidate beams associated with the adapted angular range based at least in part on determining the adapted codebook; and/or the like. In some aspects, such means may include one or more components of base station 110, UE 120, and/or the like described in connection with FIG. 2. For example, means for determining the adapted codebook can, but not necessarily, include, for example, controller/processor 240, controller/processor 280, transmit processor 220, transmit processor 264, TX MIMO processor 230, TX MIMO processor 266, and/or the like. Additionally or alternatively, means for transmitting using at least one beam of the adapted set of candidate beams can, but not necessarily, include, for example, controller/processor 240, controller/processor 280, transmit processor 220, transmit processor 264, TX MIMO processor 230, TX MIMO processor 266, MOD 232, MOD 254, antenna 234, antenna 252, and/or the like.

In some aspects, a receiver device (e.g., base station 110, UE 120, and/or the like) may include means for determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook; means for receiving using at least one beam of the adapted set of candidate beams associated with the adapted angular range based at least in part on determining the adapted codebook; and/or the like. In some aspects, such means may include one or more components of base station 110, UE 120, and/or the like described in connection with FIG. 2. For example, means for determining the adapted codebook can, but not necessarily, include, for example, controller/processor 240, controller processor 280, receive processor 238, receive processor 258, MIMO detector 236, MIMO detector 256, and/or the like. Additionally or alternatively, means for receiving using at least one beam of the adapted set of candidate beams can, but not necessarily, include, for example, controller/processor 240, controller/processor 280, receive processor 238, receive processor 258, MIMO detector 236, MIMO detector 256, DEMOD 232, DEMOD 254, antenna 234, antenna 252, and/or the like.

As indicated above, FIG. 2 is provided merely as an example. Other examples may differ from what is described with regard to FIG. 2.

Figure 3A:
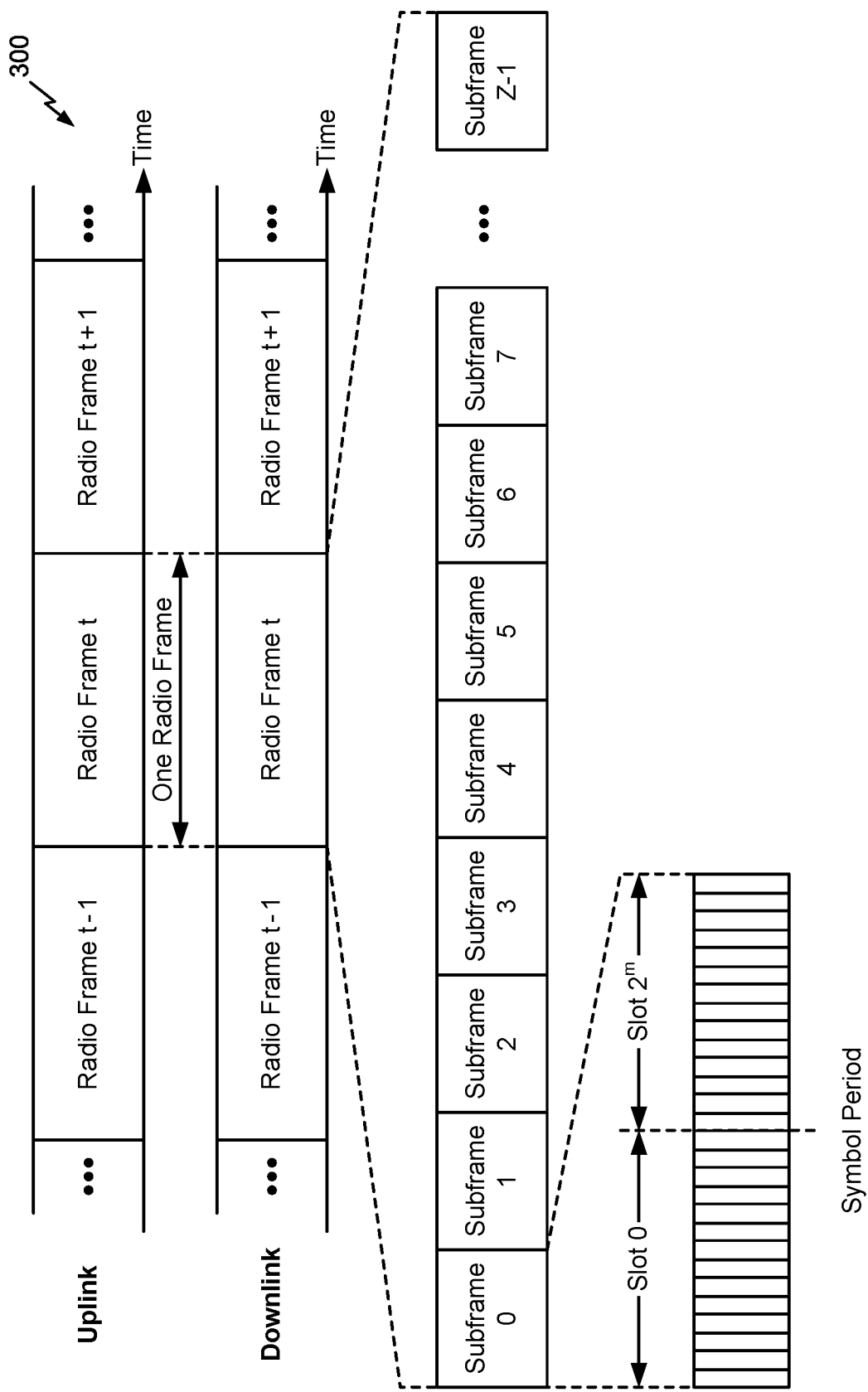
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. In this case, the base station may transmit such synchronization signals using beamforming, using a particular angular range of beams, and/or the like to ensure communication between the base station and a UE. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
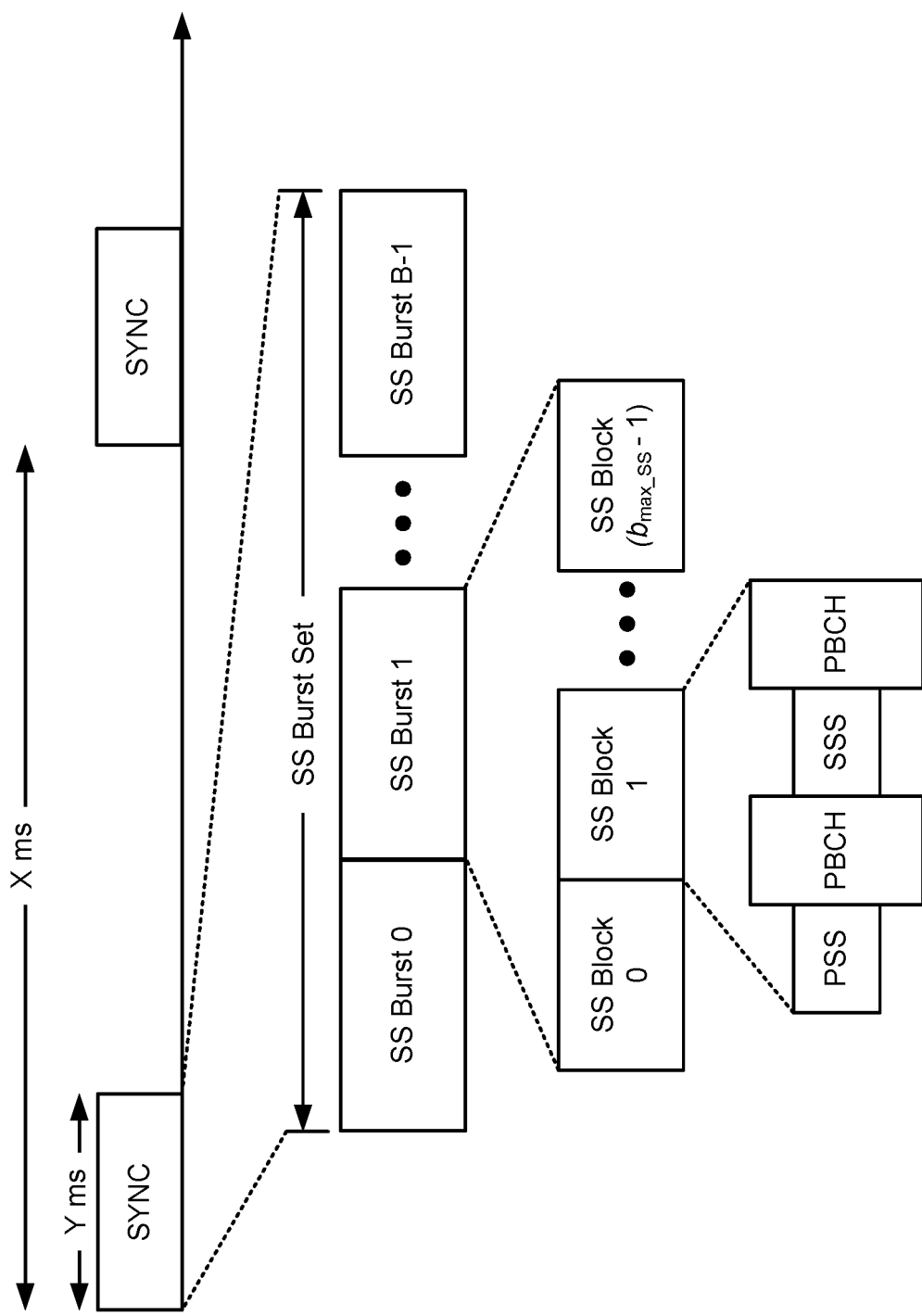
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. For example, a base station may determine a particular codebook with a particular angular range for transmissions of the SS burst set. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
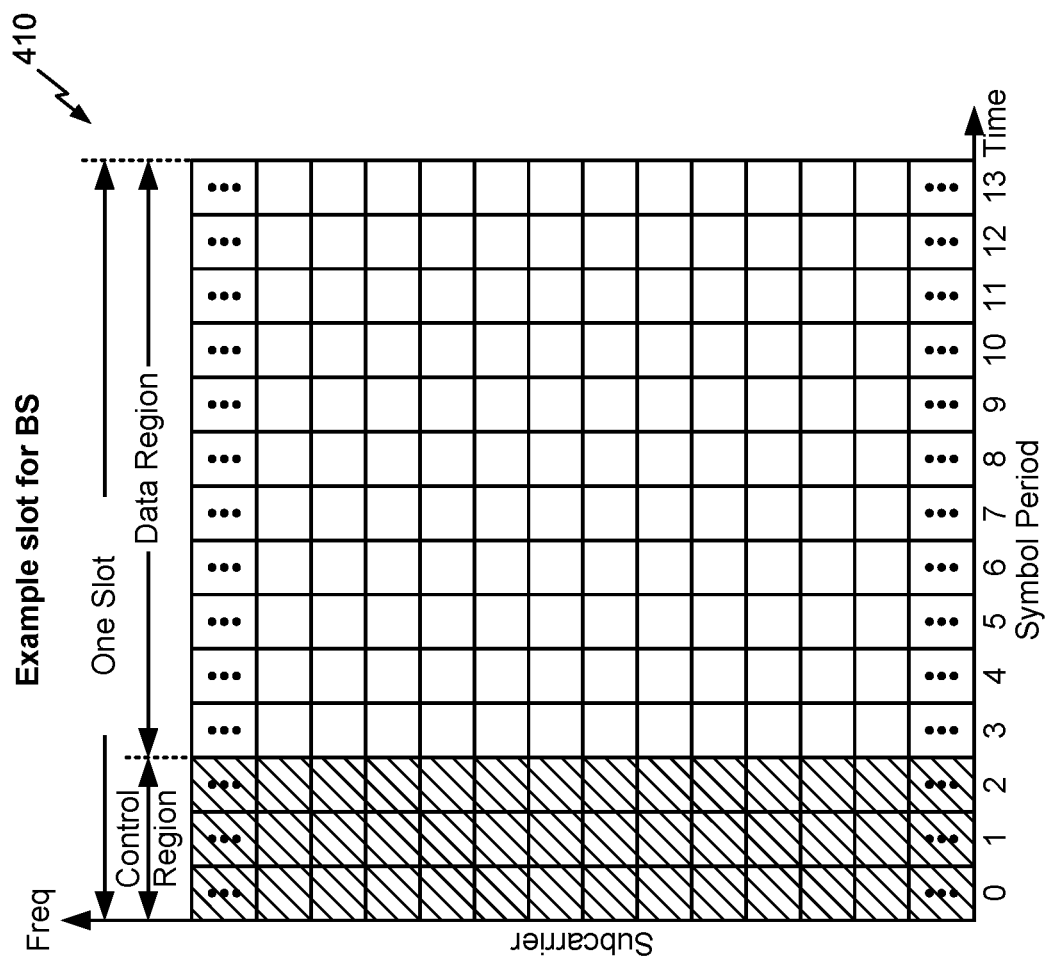
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs each of which may use beamforming for transmitting to the UE, thereby increasing a coverage range, reducing a likelihood of interference, and/or the like. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
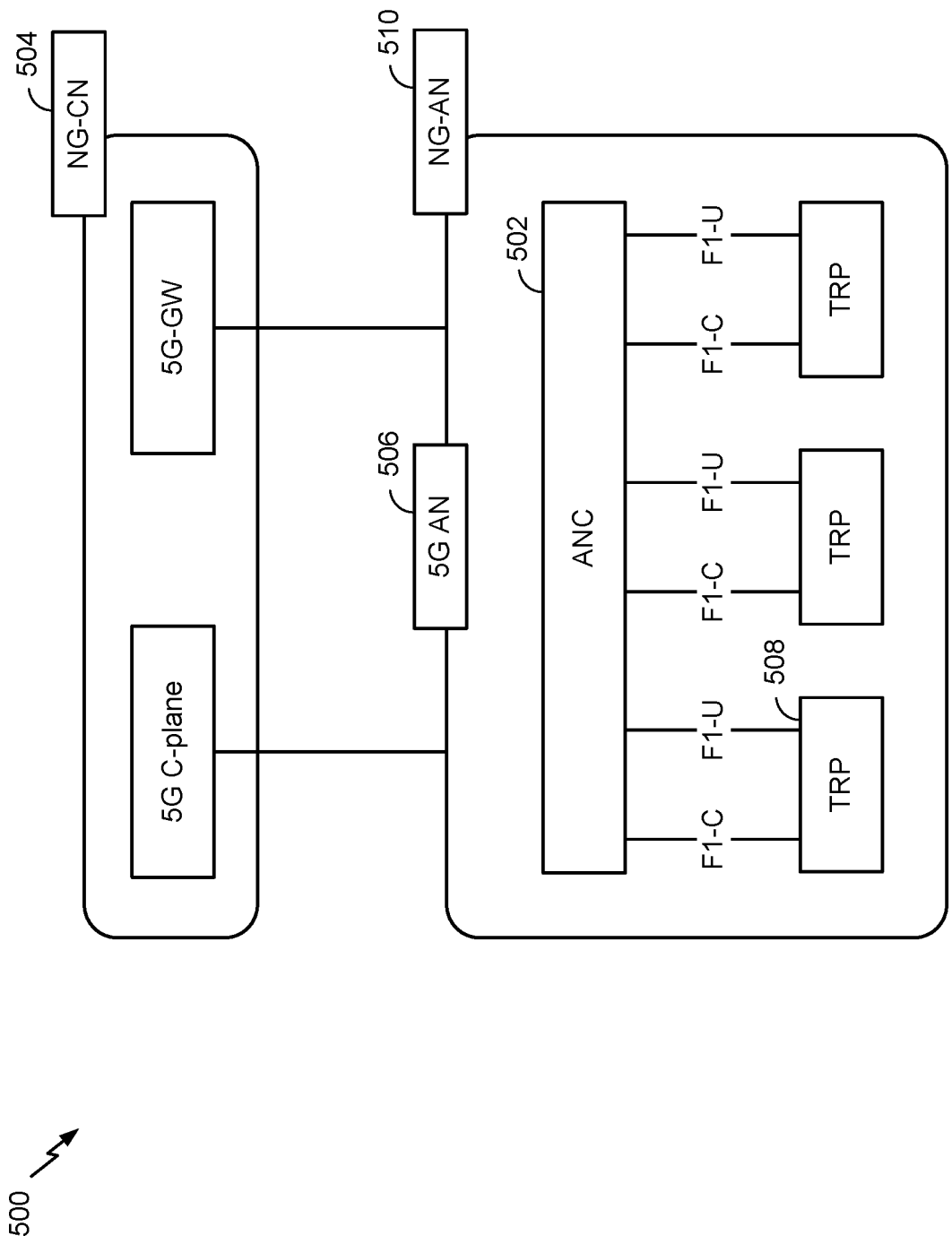
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. The TRPs may use beamforming with an adapted codebook described herein to communicate with a UE at an extended coverage range, with reduced interference, and/or the like.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
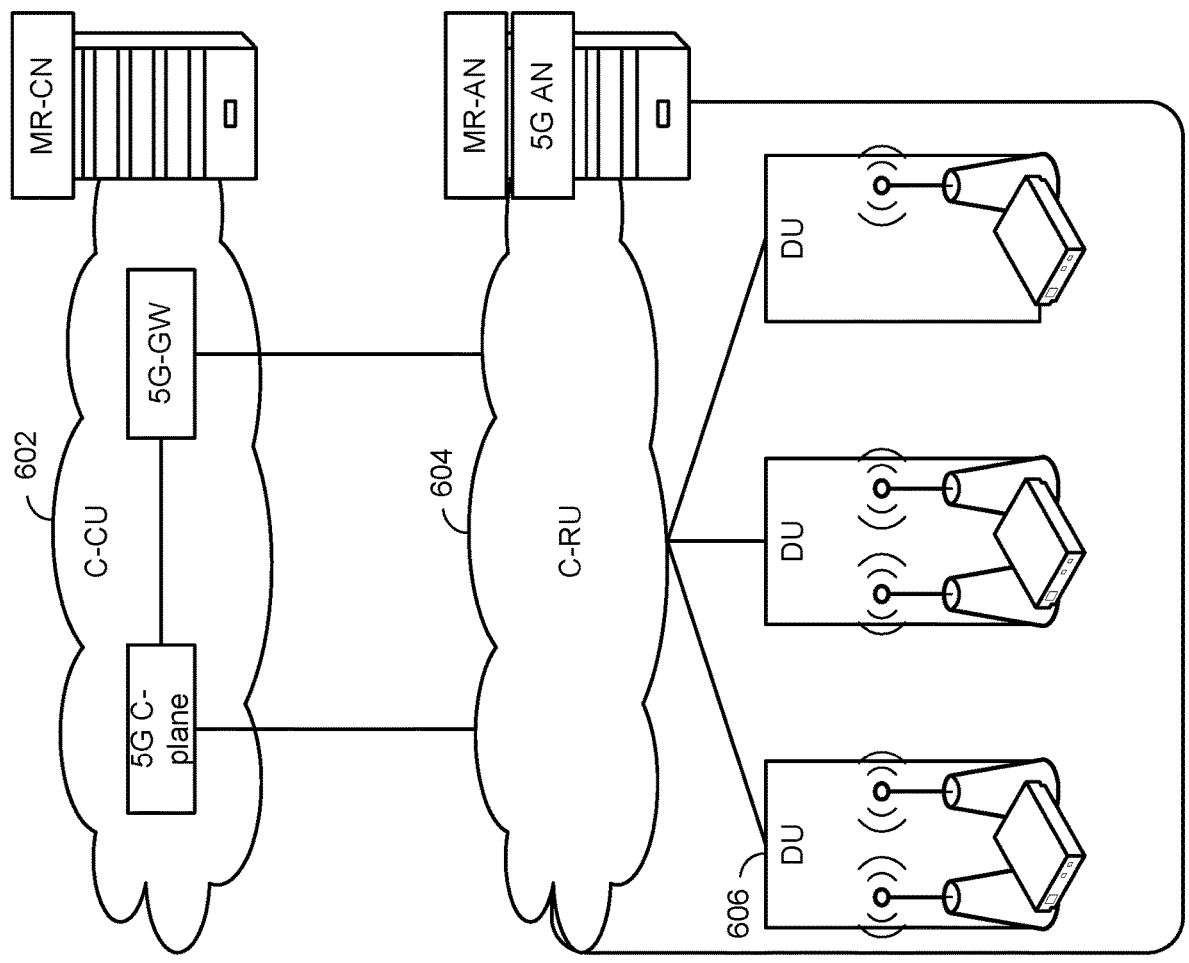
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality. The DU may use beamforming to communicate with a UE as described herein.

As indicated above, FIG. 6 is provided merely as an example. Other examples may differ from what is described with regard to FIG. 6.

In some communications systems, such as 5G or NR, a transmitter device, such as a BS, may transmit to a receiver device, such as a UE, using beamforming. The BS may determine an angular coverage for one or more candidate beams for communication with the UE based at least in part on a codebook. The codebook may identify, for a beam of the one or more candidate beams identified in the codebook, an angular coverage. However, a range of possible communication paths for transmissions from the BS to the UE (e.g., an angle of departure and an angle of arrival for a candidate beam) may be a relatively small angular range. For example, the range of possible communication paths may be associated with a smaller angular range than is covered by candidate beams of the codebook. As a result, the BS may use excessive amounts of overhead and/or power consumption by transmitting candidate beams that do not overlap with the range of possible communication paths.

Some implementations, described herein, perform codebook adaptation. For example, a transmitter device, such as a BS, may determine one or more spatial parameters, such as an angle of departure, an angle of arrival, and/or the like, and may determine an adapted codebook that is different from an initial codebook. In this case, the adapted codebook may be associated with a reduced angular coverage relative to the initial codebook, thereby reducing overhead and/or power consumption by reducing a likelihood of the transmitter device transmitting a candidate beam that is not within the range of possible communication paths.

Figure 7:
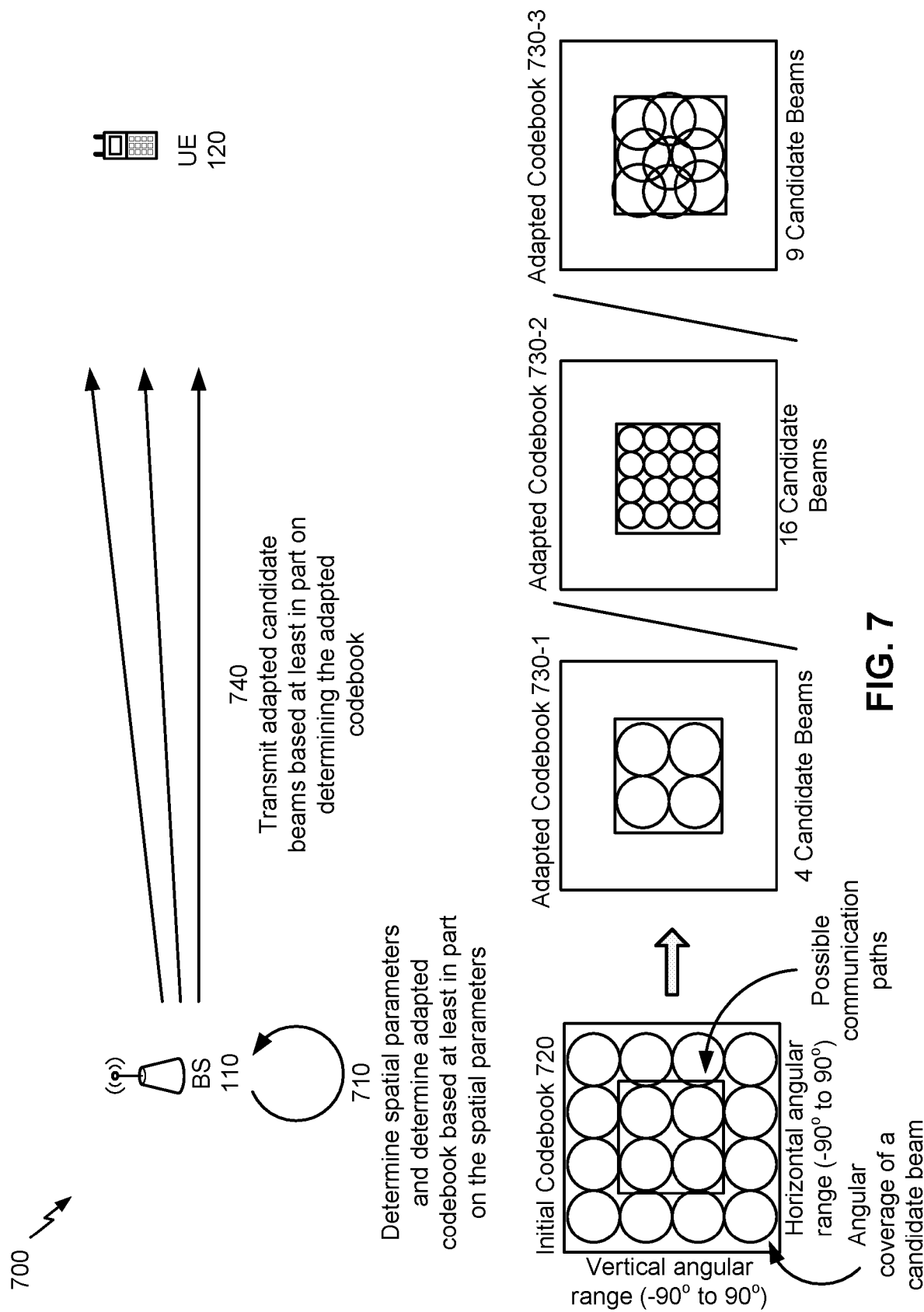
FIG. 7 is a diagram illustrating an example of codebook adaptation, in accordance with various aspects of the present disclosure.

FIG. 7 is a diagram illustrating an example 700 of codebook adaptation, in accordance with various aspects of the present disclosure. As shown in FIG. 7, example 700 includes a BS 110 (such as any of BSs 110*a*, 110*b*, 110*c*, and/or 110*d* with reference to FIG. 1) and a UE 120 (such as any of UEs 120*a*, 120*b*, 120*c*, 120*d*, and/or 120*e* with reference to FIG. 1). Although some aspects are described herein in terms of a BS in communication with a UE (e.g., BS 110 communication with UE 120), various other scenarios may be possible, such as a first UE communication with a second UE, a first BS communication with a second BS, and/or the like.

As further shown in FIG. 7, and by reference number 710, BS 110 may determine spatial parameters, and may determine an adapted codebook based at least in part on the spatial parameters. In some aspects, BS 110 may determine the spatial parameters based at least in part on a measurement. For example, BS 110 may identify a set of candidate beams of initial codebook 720 and may use one or more of the candidate beams, of the set of candidate beams, to measure an incoming signal angle of arrival (AoA). In this case, BS 110 may determine the adapted codebook 730 (e.g., adapted codebook 730-1, 730-2, 730-3, and/or the like) based at least in part on initial codebook 720 and the incoming signal angle of arrival. For example, in adapted codebook 730-1, BS 110 may identify a set of 4 candidate beams; in adapted codebook 730-2, BS 110 may identify a set of 16 candidate beams, and in adapted codebook 730-3, BS 110 may identify a set of 9 candidate beams. Further to the example, BS 110 may continue to use candidate beams of initial codebook 720, which are not in a selected adapted codebook 730, for measuring the incoming signal angle of arrival or another spatial parameter to further adapt the selected adapted codebook 730. In some aspects, BS 110 may determine another spatial parameter, such as a signal strength parameter, an interference parameter (e.g., a measured interference by BS 110, a measured interference by UE 120, and/or the like), and/or the like.

In some aspects, BS 110 may determine the spatial parameters based at least in part on receiving a report (e.g., from UE 120). For example, BS 110 may configure a measurement period and may transmit a set of training signals associated with candidate beams of initial codebook 720 during the measurement period for receipt by UE 120. In this case, based at least in part on UE 120 receiving a training signal, of the set of training signals, UE 120 may transmit a measurement report identifying an angle of arrival parameter, an angle of departure (AoD) parameter, and/or the like. Additionally, or alternatively, UE 120 may transmit a report identifying an interference value for a particular candidate beam, a particular angular range, and/or the like. In some aspects, the set of training signals may be a particular type of signal. For example, BS 110 may transmit a channel state information reference signal (CSI-RS) type of signal, a synchronization signal block (SSB) type of signal, and/or the like. In some aspects, BS 110 may configure the set of training signals as one or more measurement beams and may configure one or more measurement antennas (e.g., different from one or more antennas used for transmitting candidate beams associated with initial codebook 720 and/or adapted codebook 730) to transmit and/or receive the one or more measurement beams to determine the spatial parameters (e.g., the angle of arrival parameter, the angle of departure parameter, and/or the like). In this way, BS 110 may track spatial parameters concurrently with using initial codebook 720, an adapted codebook 730, and/or the like.

In some aspects, BS 110 may determine an adapted codebook 730 that is different from initial codebook 720 based at least in part on the spatial parameters. For example, BS 110 may determine that a set of possible communication paths is a subset of an angular range covered by initial codebook 720 and may determine an adapted codebook 730 that covers the subset of the angular range.

In some aspects, BS 110 may select a subset of candidate beams of initial codebook 720 for an adapted codebook, as shown by adapted codebook 730-1. In this case, adapted codebook 730-1 includes fewer candidate beams (illustrated as 4 candidate beams) than initial codebook 720 (illustrated as 16 candidate beams) and each adapted candidate beam of adapted codebook 730-1 is a same size (e.g., a same angular coverage) as another beam of initial codebook 720. In this way, BS 110 may reduce overhead and/or power consumption associated with transmitting relative to using initial codebook 720.

In some aspects, BS 110 may adjust coverage of candidate beams of initial codebook 720 for an adapted codebook, as shown by adapted codebook 730-2. In this case, adapted codebook 730-2 includes a same number of candidate beams as initial codebook 720 (illustrated in the example of codebooks 720 and 730-2 as 16 candidate beams) and each adapted candidate beam of adapted codebook 730-2 covers a smaller angular range (e.g., in horizontal angle and in vertical angle) than another beam of initial codebook 720. In this way, BS 110 may achieve a higher beam gain for candidate beams of adapted codebook 730-2 relative to corresponding beams of initial codebook 720, thereby improving link budget, interference rejection, and network performance.

In some aspects, BS 110 may adjust a beam density to determine the adapted codebook, as shown by adapted codebook 730-3. In this case, BS 110 may reduce a number of candidate beams relative to initial codebook 720 (e.g., from 16 candidate beams to 9 candidate beams) but may not reduce an angular coverage of the adapted candidate beams relative to initial candidate beams of initial codebook 720. Further to the example, BS 110 may overlap the angular coverage of the adapted candidate beams of adapted codebook 730-3, thereby increasing a beam density (e.g., a total intensity of all beams that cover a given range) for adapted codebook 730-3 relative to initial codebook 720. In this case, based at least in part on increasing a beam density for adapted codebook 730-3, BS 110 reduces a likelihood that an area is weakly covered by adapted candidate beams relative to using initial codebook 720, reduces overhead associated with the adapted candidate beams relative to the initial candidate beams, reduces power consumption to transmit the adapted candidate beams relative to the initial candidate beams, and/or the like.

In some aspects, BS 110 may signal an adapted codebook 730 (e.g., one of 730-1, 730-2, and/or 730-3) based at least in part on determining an adapted codebook 730. For example, BS 110 may transmit a message identifying a selected adapted codebook 730 to UE 120 to enable UE 120 to receive an adapted candidate beam associated with the selected adapted codebook 730. In some aspects, BS 110 and/or UE 120 may perform a beam management procedure (e.g., beam management processes P1, P2, and/or P3 for refining a transmit beam or a receive beam) to communicate one or more messages relating to using adapted codebook 730. Although some aspects, described herein are described in terms of BS 110 determining and using an adapted codebook, some aspects described herein may include UE 120 determining and using an adapted codebook.

As further shown in FIG. 7, and by reference number 740, based at least in part on determining an adapted codebook 730, BS 110 may transmit using one or more adapted candidate beams of the adapted codebook 730. In this way, BS 110 improves network performance relative to using a statically configured initial codebook 720.

As indicated above, FIG. 7 is provided as an example. Other examples are possible and may differ from what was described with respect to FIG. 7.

Figure 8:
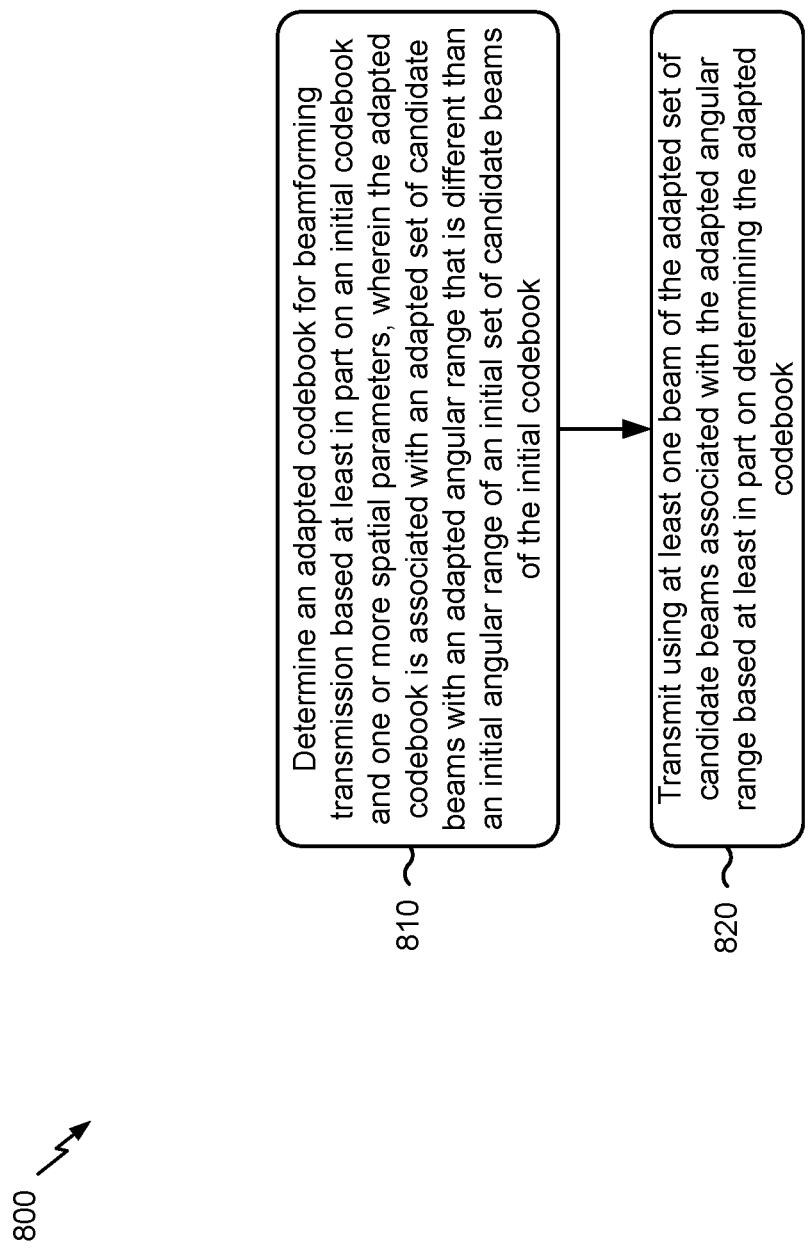
FIG. 8 is a diagram illustrating an example process performed, for example, by a transmitter device, in accordance with various aspects of the present disclosure.

FIG. 8 is a diagram illustrating an example process 800 performed, for example, by a transmitter device, in accordance with various aspects of the present disclosure. Example process 800 is an example where a transmitter device (e.g., BS 110, UE 120, and/or the like) performs codebook adaptation.

As shown in FIG. 8, in some aspects, process 800 may include determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook (block 810). For example, the transmitter device (e.g., BS 110 or UE 120 using, e.g., controller/processor 240, controller/processor 280, and/or the like) may determine the adapted codebook for beamforming transmission based at least in part on the initial codebook and one or more spatial parameters, as described above. In some aspects, the adapted codebook is associated with the adapted set of candidate beams with the adapted angular range that is different than the initial angular range of the initial set of candidate beams of the initial codebook.

As shown in FIG. 8, in some aspects, process 800 may include transmitting using at least one beam of the adapted set of candidate beams associated with the adapted angular range based at least in part on determining the adapted codebook (block 820). For example, the transmitter device (e.g., BS 110 or UE 120 using, e.g., controller/processor 240, transmit processor 220, TX MIMO processor 230, MOD 232, antenna 234, controller/processor 280, transmit processor 264, TX MIMO processor 266, MOD 254, antenna 252, and/or the like) may transmit using the at least one beam of the adapted set of candidate beams associated with the adapted angular range based at least in part on determining the adapted codebook, as described above.

Process 800 may include additional aspects, such as any single aspect and/or any combination of aspects described below and/or in connection with one or more other processes described elsewhere herein.

In some aspects, a candidate beam, of the adapted set of candidate beams, is associated with a same coverage angle as another candidate beam of the initial set of candidate beams, and a first number of candidate beams in the adapted set of candidate is smaller than a second number of candidate beams in the initial set of candidate beams. In some aspects, a candidate beam, of the adapted set of candidate beams, is associated with a reduced power consumption or overhead data relative to another candidate beam of the initial set of candidate beams. In some aspects, a candidate beam, of the adapted set of candidate beams, is associated with a smaller coverage angle than another candidate beam of the initial set of candidate beams, and a first number of candidate beams in the adapted set of candidate beams is a same number as a second number of candidate beams in the initial set of candidate beams.

In some aspects, a candidate beam, of the adapted set of candidate beams, is associated with a higher gain relative to another candidate beam of the initial set of candidate beams. In some aspects, the adapted set of candidate beams is configured to cover an effective angular range of communication paths with at least one device. In some aspects, the adapted set of candidate beams is associated with higher candidate beam density relative to the initial set of candidate beams. In some aspects, the one or more spatial parameters are determined based at least in part on a measurement of the initial set of candidate beams.

In some aspects, the one or more spatial parameters are determined based at least in part on a training signal received during a measurement period from at least one other device. In some aspects, the one or more spatial parameters are determined using a different set of beams or a different set of antennas relative to the initial set of candidate beams or an initial set of antennas associated with the initial set of candidate beams. In some aspects, the one or more spatial parameters include at least one of a signal strength parameter, an interference parameter, a measured parameter, a reported parameter, an angle of arrival parameter, an angle of departure parameter, and/or the like.

In some aspects, the transmitter device is configured to transmit a codebook update message to at least one other device to identify the adapted codebook before using the adapted codebook. In some aspects, the transmitter device is configured to perform a beam management procedure to identify the adapted set of candidate beams of the adapted codebook. In some aspects, the transmitter device is a base station (BS) (e.g., BS 110). In some aspects, the transmitter device is a user equipment (UE) (e.g., UE 120).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
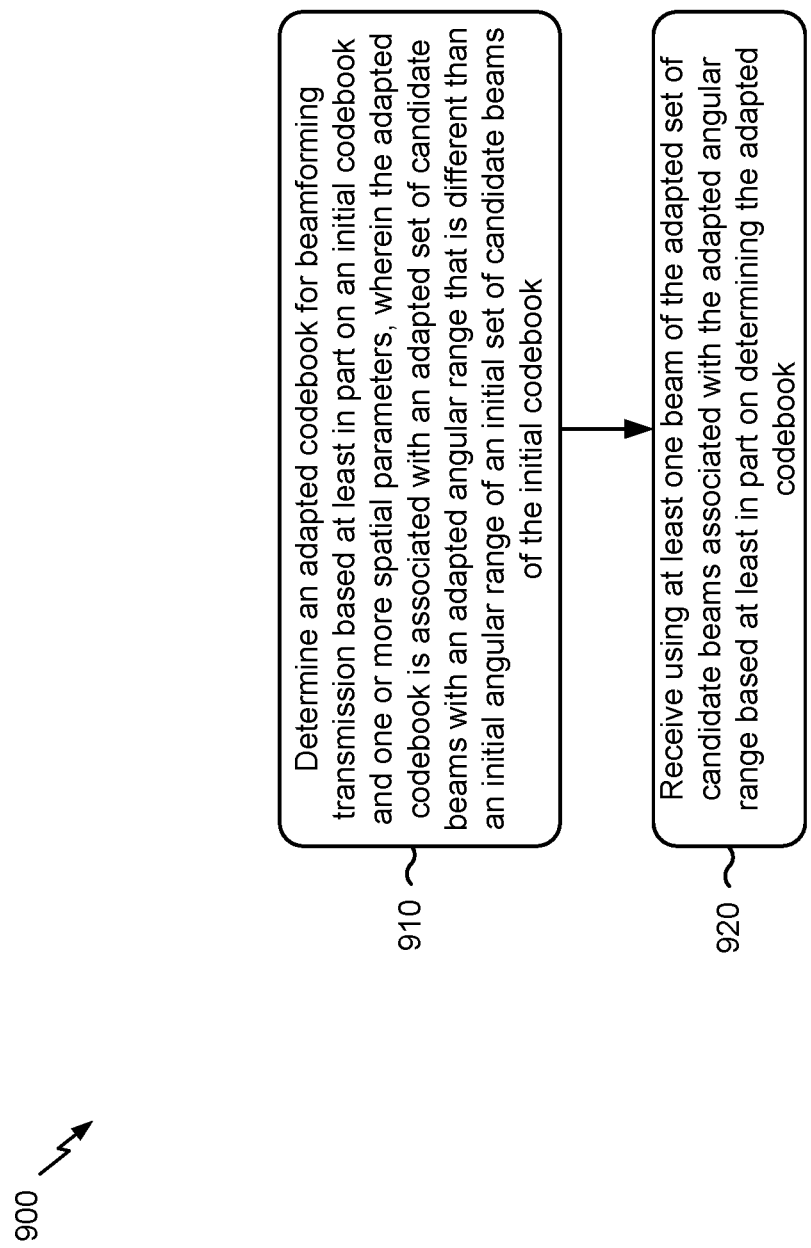
FIG. 9 is a diagram illustrating an example process performed, for example, by a receiver device, in accordance with various aspects of the present disclosure.

FIG. 9 is a diagram illustrating an example process 900 performed, for example, by a receiver device, in accordance with various aspects of the present disclosure. Example process 900 is an example where a receiver device (e.g., BS 110, UE 120, and/or the like) performs codebook adaptation.

As shown in FIG. 9, in some aspects, process 900 may include determining an adapted codebook for beamforming transmission based at least in part on an initial codebook and one or more spatial parameters, wherein the adapted codebook is associated with an adapted set of candidate beams with an adapted angular range that is different than an initial angular range of an initial set of candidate beams of the initial codebook (block 910). For example, the receiver device (e.g., BS 110 or UE 120 using, e.g., controller/processor 240, controller/processor 280, and/or the like) may determine an adapted codebook for beamforming transmission based at least in part on an initial codebook and one or more spatial parameters, as described in more detail above. In some aspects, the adapted codebook is associated with an adapted set of candidate beams with an adapted angular range that is different than an initial angular range of an initial set of candidate beams of the initial codebook.

As shown in FIG. 9, in some aspects, process 900 may include receiving using at least one beam of the adapted set of candidate beams associated with the adapted angular range based at least in part on determining the adapted codebook (block 920). For example, the receiver device (e.g., BS 110 or UE 120 using, e.g., antenna 234, DEMOD 232, MIMO detector 236, receive processor 238, controller/processor 240, antenna 252, DEMOD 254, MIMO detector 256, receive processor 258, controller/processor 280, and/or the like) may receive using at least one beam of the adapted set of candidate beams associated with the adapted angular range based at least in part on determining the adapted codebook, as described in more detail above.

Process 900 may include additional aspects, such as any single aspect and/or any combination of aspects described below and/or in connection with one or more other processes described elsewhere herein.

In some aspects, the adapted angular range is smaller or larger than the initial angular range. In some aspects, a candidate beam, of the adapted set of candidate beams, is associated with a same coverage angle as another candidate beam of the initial set of candidate beams, and a first number of candidate beams in the adapted set of candidate is smaller than a second number of candidate beams in the initial set of candidate beams. In some aspects, a candidate beam, of the adapted set of candidate beams, is associated with a reduced power consumption or overhead data relative to another candidate beam of the initial set of candidate beams. In some aspects, a candidate beam, of the adapted set of candidate beams, is associated with a smaller coverage angle than another candidate beam of the initial set of candidate beams, and a first number of candidate beams in the adapted set of candidate beams is a same number as a second number of candidate beams in the initial set of candidate beams.

In some aspects, a candidate beam, of the adapted set of candidate beams, is associated with a higher gain relative to another candidate beam of the initial set of candidate beams. In some aspects, the adapted set of candidate beams is configured to cover an effective angular range of communication paths with at least one device. In some aspects, the adapted set of candidate beams is associated with higher candidate beam density relative to the initial set of candidate beams.

In some aspects, the one or more spatial parameters are determined based at least in part on a measurement of the initial set of candidate beams. In some aspects, the one or more spatial parameters are determined based at least in part on a training signal transmitted during a measurement period to a transmitter device. In some aspects, the one or more spatial parameters are determined using a different set of beams or a different set of antennas relative to the initial set of candidate beams or an initial set of antennas associated with the initial set of candidate beams.

In some aspects, the one or more spatial parameters include at least one of: a signal strength parameter, an interference parameter, a measured parameter, a reported parameter, an angle of arrival parameter, or an angle of departure parameter. In some aspects, the receiver device is configured to receive a codebook update message from a transmitter device to identify the adapted codebook before using the adapted codebook. In some aspects, the receiver device is configured to perform a beam management procedure to identify the adapted set of candidate beams of the adapted codebook.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   determining an adapted codebook for beamforming transmission based at least in part on an initial codebook and one or more spatial parameters,
      wherein the adapted codebook is associated with an adapted set of candidate beams with an adapted angular range that is different than an initial angular range of an initial set of candidate beams of the initial codebook, and
      wherein a number of candidate beams in the adapted set of candidate beams is smaller than a number of candidate beams in the initial set of candidate beams; and
   transmitting information using at least one beam of the adapted set of candidate beams based at least in part on determining the adapted codebook.

2. The method of claim 1, wherein the adapted angular range is smaller or larger than the initial angular range.

3. The method of claim 1, wherein a candidate beam, of the adapted set of candidate beams, is associated with a same coverage angle as another candidate beam of the initial set of candidate beams.

4. The method of claim 1, wherein a candidate beam, of the adapted set of candidate beams, is associated with a reduced power consumption or overhead data relative to another candidate beam of the initial set of candidate beams.

5. The method of claim 1, wherein a candidate beam, of the adapted set of candidate beams, is associated with a higher gain relative to another candidate beam of the initial set of candidate beams.

6. The method of claim 1, wherein the adapted set of candidate beams is configured to cover an effective angular range of communication paths with at least one device.

7. The method of claim 1, wherein the adapted set of candidate beams is associated with higher candidate beam density relative to the initial set of candidate beams.

8. The method of claim 1, wherein the one or more spatial parameters are determined based at least in part on a measurement of the initial set of candidate beams.

9. The method of claim 1, wherein the one or more spatial parameters are determined based at least in part on a training signal received during a measurement period from at least one other device.

10. The method of claim 1, wherein the one or more spatial parameters are determined using a different set of beams or a different set of antennas relative to the initial set of candidate beams or an initial set of antennas associated with the initial set of candidate beams.

11. The method of claim 1, wherein the one or more spatial parameters include at least one of:
   a signal strength parameter,
   an interference parameter,
   a measured parameter,
   a reported parameter,
   an angle of arrival parameter, or
   an angle of departure parameter.

12. The method of claim 1, wherein the transmitter device is configured to transmit a codebook update message to at least one other device to identify the adapted codebook before using the adapted codebook.

13. The method of claim 1, wherein the transmitter device is configured to perform a beam management procedure to identify the adapted set of candidate beams of the adapted codebook.

14. A method of wireless communication performed by a receiver device, comprising:
   determining an adapted codebook for beamforming transmission based at least in part on an initial codebook and one or more spatial parameters,
      wherein the adapted codebook is associated with an adapted set of candidate beams with an adapted angular range that is different than an initial range of an initial set of candidate beams of the initial codebook, and
      wherein a number of candidate beams in the adapted set of candidate beams is smaller than a number of candidate beams in the initial set of candidate beams; and
   receiving information using at least one beam of the adapted set of candidate beams based at least in part on determining the adapted codebook.

15. The method of claim 14, wherein the adapted angular range is smaller or larger than the initial angular range.

16. The method of claim 14, wherein a candidate beam, of the adapted set of candidate beams, is associated with a same coverage angle as another candidate beam of the initial set of candidate beams.

17. The method of claim 14, wherein a candidate beam, of the adapted set of candidate beams, is associated with a reduced power consumption or overhead data relative to another candidate beam of the initial set of candidate beams.

18. The method of claim 14, wherein a candidate beam, of the adapted set of candidate beams, is associated with a higher gain relative to another candidate beam of the initial set of candidate beams.

19. The method of claim 14, wherein the adapted set of candidate beams is configured to cover an effective angular range of communication paths with at least one device.

20. The method of claim 14, wherein the adapted set of candidate beams is associated with higher candidate beam density relative to the initial set of candidate beams.

21. The method of claim 14, wherein the one or more spatial parameters are determined based at least in part on a measurement of the initial set of candidate beams.

22. The method of claim 14, wherein the one or more spatial parameters are determined based at least in part on a training signal transmitted during a measurement period to a transmitter device.

23. The method of claim 14, wherein the one or more spatial parameters are determined using a different set of beams or a different set of antennas relative to the initial set of candidate beams or an initial set of antennas associated with the initial set of candidate beams.

24. The method of claim 14, wherein the one or more spatial parameters include at least one of:
    a signal strength parameter,
    an interference parameter,
    a measured parameter,
    a reported parameter,
    an angle of arrival parameter, or
    an angle of departure parameter.

25. The method of claim 14, wherein the receiver device is configured to receive a codebook update message from a transmitter device to identify the adapted codebook before using the adapted codebook.

26. The method of claim 14, wherein the receiver device is configured to perform a beam management procedure to identify the adapted set of candidate beams of the adapted codebook.

27. A transmitter device for wireless communication, comprising:
    a memory; and
    one or more processors operatively coupled to the memory, the memory and the one or more processors configured to:
        determine an adapted codebook for beamforming transmission based at least in part on an initial codebook and one or more spatial parameters,
            wherein the adapted codebook is associated with an adapted set of candidate beams with an adapted angular range that is different than an initial angular range of an initial set of candidate beams of the initial codebook, and
            wherein a number of candidate beams in the adapted set of candidate beams is smaller than a number of candidate beams in the initial set of candidate beams; and
        transmit information using at least one beam of the adapted set of candidate beams based at least in part on determining the adapted codebook.

28. A receiver device for wireless communication, comprising:
    a memory; and
    one or more processors operatively coupled to the memory, the memory and the one or more processors configured to:
        determine an adapted codebook for beamforming transmission based at least in part on an initial codebook and one or more spatial parameters,
            wherein the adapted codebook is associated with an adapted set of candidate beams with an adapted angular range that is different than an initial angular range of an initial set of candidate beams of the initial codebook, and
            wherein a number of candidate beams in the adapted set of candidate beams is smaller than a number of candidate beams in the initial set of candidate beams; and
        receive information using at least one beam of the adapted set of candidate beams based at least in part on determining the adapted codebook.

29. The transmitter device of claim 27, wherein a candidate beam, of the adapted set of candidate beams, is associated with a same coverage angle as another candidate beam of the initial set of candidate beams.

30. The receiver device of claim 28, wherein a candidate beam, of the adapted set of candidate beams, is associated with a same coverage angle as another candidate beam of the initial set of candidate beams.

* * * * *